July 25, 1944.    S. J. DEITZ    2,354,185

SPOOLING MECHANISM AND MOTOR CONTROL CIRCUIT

Filed April 28, 1942    2 Sheets-Sheet 1

INVENTOR
STEPHEN J. DEITZ
BY Bohleber, Fassett + Montstream
ATTORNEYS

July 25, 1944.    S. J. DEITZ    2,354,185
SPOOLING MECHANISM AND MOTOR CONTROL CIRCUIT
Filed April 28, 1942    2 Sheets-Sheet 2
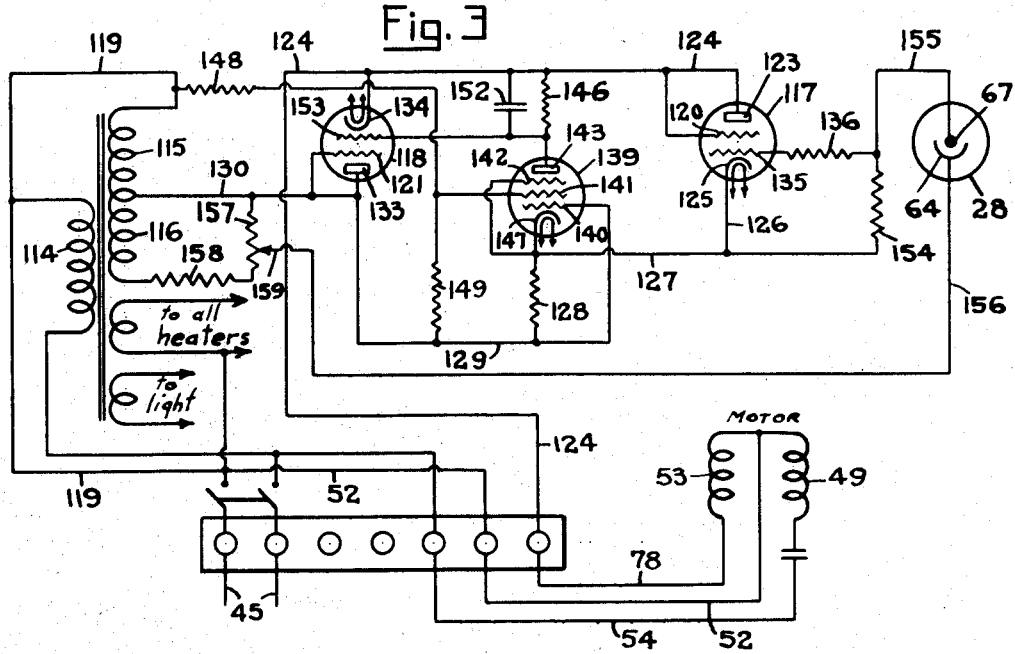
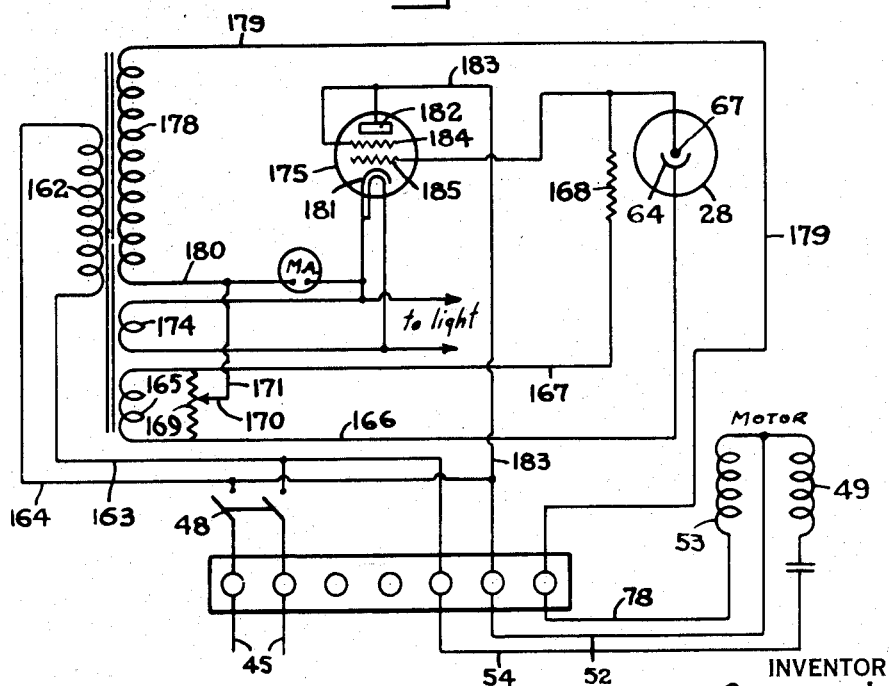
INVENTOR
STEPHEN J. DEITZ
BY Bohleber, Fassett & Montstream
ATTORNEYS Patented July 25, 1944

2,354,185

UNITED STATES PATENT OFFICE 2,354,185

SPOOLING MECHANISM AND MOTOR CONTROL CIRCUIT

Stephen J. Deitz, Torrington, Conn., assignor to United Cinephone Corporation, Torrington, Conn., a corporation of New York Application April 28, 1942, Serial No. 440,822

25 Claims. (Cl. 172—239)

The invention relates to a spooling or drum winding mechanism which utilizes a variable speed transmission for rotating the spool or drum at a substantially uniform peripheral speed for the material being wound thereon as the diameter of the spooled material builds up on the spool. The variable speed transmission is operated by a motor which has a control circuit which adjusts the speed relation of the variable speed transmission. The spooling mechanism has particular reference to the winding of wire on a spool which wire issues from a high speed wire drawing machine. The invention also relates to the motor and motor control circuit for adjusting the relative speed ratio of the variable speed transmission.

Wire is drawn in a high speed wire drawing machine at the rate of about 5,000 feet per minute and is wound upon a spool at this high speed. In any spooling operation the peripheral speed of the winding operation must remain constant or substantially constant, in order to avoid breaking of the wire, and since the diameter of the coils upon the spool increases, this necessitates a gradual reduction in the rotating speed of the spool. This progressive decrease in the rotative speed of the spool is necessary in order to secure a substantially uniform wire tension and substantially uniform tightness of winding. A uniform peripheral speed in the spooling operation is obtained by driving the spool from a variable speed transmission of any suitable kind. The relative change in speed of rotation of the variable speed transmission is controlled by a motor and the motor in turn is controlled by the diameter of the coils of wire or the like upon the spool so that as the diameter changes, i. e. increases, the motor is energized to alter the speed ratio of the variable speed transmission whereby the rotative speed of the spool is reduced and hence the peripheral speed remains substantially uniform.

It is an object of the invention to provide a spooling mechanism which is driven through a variable speed transmission, the relative speed of the latter being adjusted during the spooling operation by a motor which is in turn controlled by a new and novel circuit.

Another object of the invention is to construct a motor control circuit in which the motor winding or a portion thereof is directly connected through an electron discharge tube or tubes included in the control circuit.

Another object is to construct a motor control circuit utilizing electron discharge tubes in which the current for a motor winding passes through an electron discharge tube or tubes which are controlled by a photoelectric cell or phototube.

Another object is to construct a motor circuit in which the motor winding is directly connected in series with a pair of tubes for full wave supply of current to the motor and the flow of current through the tubes is controlled in order to control the motor.

Another object is to construct a motor and circuit combination which will permit the use of a motor of considerably smaller rating.

Other objects of the invention will be more apparent from the following description taken in connection with the accompanying drawings which illustrate preferred embodiments of the invention in which, Figure 1 is a diagrammatic view of a spooling mechanism which is driven through a variable speed transmission of the type which utilizes conical pulleys connected together by a belt. The variable speed transmission illustrated has its speed ratio altered by a motor which is controlled by a phototube positioned to have the light beam falling on the phototube intercepted by the increasing diameter of the coils upon the spool.

Figure 2 is a circuit diagram of a motor and a motor control circuit which energizes the motor connected with the variable speed transmission for altering the speed ratio thereof. The circuit shown is a full wave A. C. circuit.

Figure 3 is a circuit diagram of a motor and another motor control circuit in which the energization of the motor is controlled by a phototube.

Figure 4 is a circuit diagram of a motor and a motor controlled circuit utilizing a phototube in which the motor is energized by a half wave of an alternating current.

Figure 1:
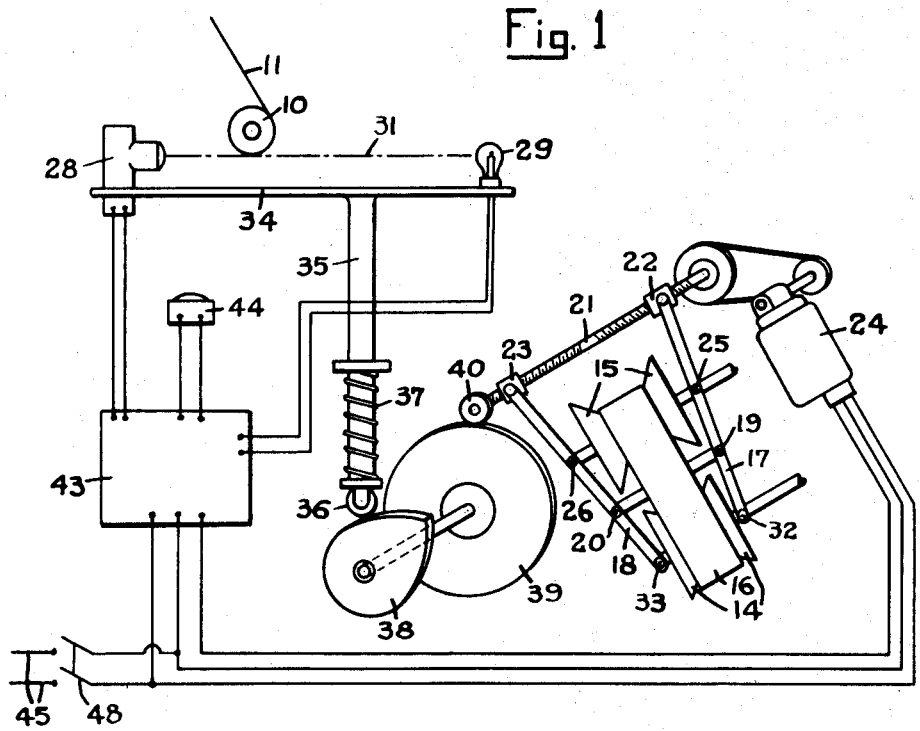

The invention is shown particularly in conjunction with a wire spooling mechanism which is used to spool wire at high speed as it issues from a wire drawing machine. As shown in Figure 1, a spool 10 is mounted to wind up any suitable material such as the wire 11. As the diameter of the wire on the spool increases, the rotative speed of the spool is decreased through a variable speed transmission of any suitable kind, that particularly illustrated including a pair of conical pulleys 14 and 15 one of which is the driven pulley connected with the spool and the other is the driving pulley. The drive between the pulleys is a belt 16.

The conical pulleys are of the split type by which the effective diameter is increased by moving the halves of the cone pulley together and the effective diameter is decreased by moving the halves of the pulley away from each other. Mechanism is provided to change the relative diameters of the conical pulleys such as by the bars 17 and 18 which are pivoted upon fixed pivot points 19 and 20 respectively. The angular position of the bars is controlled by a screw 21 having right and left hand threads. A nut 22, engaging one of the threads upon the screw 21, is pivotally secured to the bar 17 and controls the angular position of the bar. A similar nut 23 engaging the other thread on the screw 21 and secured to the bar 18 controls the angular position of this bar. The pivotal connections 25 and 32 on the bar 17 and the pivotal connections 26 and 33 on the bar 18 move one set of cones towards each other and the other set of cones away from each other and thereby change the speed relation between the pulleys. The screw 21 is rotated by an induction motor 24 through a suitable driving connection.

The motor 24 is controlled by any suitable means responsive to a change in the diameter of turns or coils upon the spool. In the preferred construction a phototube 28 is utilized for this purpose upon which a beam of light 31 is directed from a suitable light source 29, which light beam 31 is directed towards the periphery of the spool or the windings thereon.

The phototube 28 and light source 29 are carried upon a table 34 which is gradually lowered under the control of the variable speed transmission through any suitable mechanism. The table lowering mechanism particularly illustrated includes a rod 35, the lower end of which carries a cam roller 36. A spring 37 impels the rod and table downwardly so that the cam roller is in contact with a cam 38. The position of the cam is controlled by the screw 21 through a suitable gear reduction mechanism such as the gears 39 and 40. The position of the cam therefore is controlled by the variable speed transmission and hence the position of the phototube is similarly controlled. The beam of light preferably is located at or intercepted by the center of the spool whereby the control is uniform for each successive traverse of the wire across the face of the spool in opposite directions.

As the turns of wire are wound upon the spool and pass the center of the spool, the beam of light 31 is wholly or partially intercepted thereby so that the current flow through the phototube ceases or is reduced which controls the motor circuit to energize the motor 24 and rotate the screw 21. The rotation of the screw 21 changes the speed ratio of the variable speed transmission so that the rotative speed of the spool 10 is reduced and at the same time the cam 38 is rotated to lower slightly the rod 35 and table 34 with its phototube and light so that the light beam 31 is again clear of the windings on the spool. The motor 24 thereupon either stops or reduces its speed until the next series of turns of wire on the spool again obstructs the light beam whereupon the cycle of events repeats.

The spool winding machine preferably is provided with mechanism of any suitable kind for keeping the wire taut as it is wound upon the spool, but which mechanism also is capable of yielding. This mechanism is provided so that there will be no sudden or excessive tension exerted upon the wire for any reason during the winding operation such as when the wire reaches the edge of the spool and the winding changes to an increased diameter and returns across the spool. If such means were not provided any abrupt change in the peripheral speed of the wire might cause an increase in the tension upon the wire and break or tend to break the same. With the mechanism described satisfactory spooling at high speed is achieved.

The control circuit for the motor 24 may be contained in a suitable housing 43. A switch 44 may control the reversing of the motor 24 to restore the mechanism for a second spooling operation after a spool has been filled with wire or the like. The main A. C. power supply lines 45 connect with the circuit in the housing and with the motor through a suitable switch 46.

Figure 2:
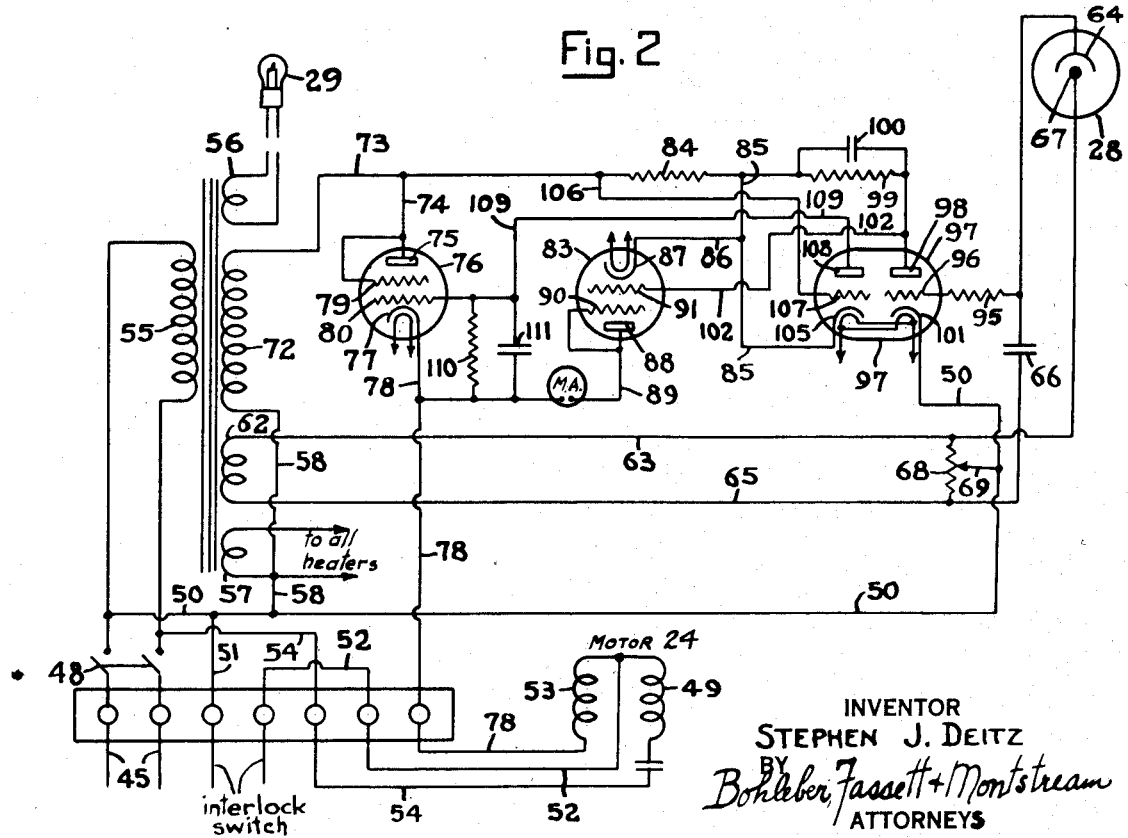

The preferred circuit for the motor 24 is illustrated in the circuit diagram of Figure 2. The power supply mains 45 are connected with the main switch 46 to which is connected one of the windings 49 of the variable speed motor 24 through the wires 50 and 51, an interlock switch (not shown), wire 52 to a point between the motor windings 49 and 53, through the motor winding 49 and wire 54.

The main switch 46 is also connected with the primary winding 55 of a transformer. The transformer preferably has a secondary winding 56 connected with the light 29. Another secondary winding 57 may be connected to all the heaters of the electron discharge tubes in the circuit. One of the leads to the heater secondary winding 57 is connected by a wire 58 to the wire 50.

Another secondary winding 62 is connected with the phototube 28 by means of the wire 63, which is directly connected with the anode 67 of the phototube, and a wire 65, which is connected, through a condenser 66 of about .0005 microfarad, with the cathode 64 of the phototube. A resistance 68 of about 10M ohms may shunt the winding and an adjustable connection 69 connects the resistance with the wire 50. The potentiometer 68, 69 permits adjustment of the potential upon the anode of the phototube to compensate for the amount of residual light which reaches the phototube.

A secondary winding 72 of the transformer is connected with the winding 53 of the motor through a pair of electron discharge tubes connected for full wave power supply to the motor. One end of the secondary winding 72 is connected through the wire 58 to the wire 50. The other end of the secondary winding is connected by wires 73 and 74 to the anode 75 of an electron discharge tube 76. The cathode 77 is connected by a wire 78 to the motor winding 53. The tube 76 is preferably a four element tube having a screen grid 79 connected to the anode of the tube and a control grid 80.

The secondary winding 72 of the transformer is connected with a second electron discharge tube 83 for the other half wave of the A. C. current. This connection is through the wire 73, resistance 84, which preferably has a resistance of about 220 ohms, the wires 85 and 86, to the cathode 87. The anode 88 of the tube 83 is connected by the wire 89 to the wire 78. The tube 83 is preferably a four element tube having a screen grid 90 connected with the anode and a control grid 91.

The current through the pair of tubes 76 and 83 is controlled by means such as the phototube 28 which in turn is controlled by the change in diameter of the material upon the spool. The cathode 64 of the phototube 28 is connected through a resistance 95 of about 2 megohms to the control grid 96 of an amplifier section of a double purpose electron discharge tube or twin triode 97. The anode 98 of the amplifier section is connected to the wire 73 through the resistance 84 and a resistance 99 of about 1 megohm, the latter having a condenser 100 of about .1 microfarad capacity in shunt therewith. The cathode 101 of the amplifier section is connected with the wire 50. The anode 98 of the amplifier section of the twin triode 97 is connected by a wire 102 to the control grid 91 of the tube 83.

As previously explained, with light falling upon the phototube 28 the motor 24 for the variable speed transmission rotates slowly or is stationary. This is because current is normally flowing through the amplifier section of the twin triode, through the circuit including the secondary winding 72, wires 58 and 50, through the amplifier section, resistances 99 and 84 and wire 73. The current through resistance 99 biases the grid 91 to cut off current through tube 83. Upon the light beam 31 being interrupted by a coil of wire on the spool 10, the current flow through the phototube is reduced or cut off and consequently the condenser 66, which normally discharges through the phototube, is charged through the grid circuit. The charge upon this condenser biases the control grid 96 so that current ceases to pass through the amplifier section which removes the bias on the grid of the tube 83 and current passes therethrough and through the motor winding 53 for a half wave of the A. C. current. The normal current through the amplifier section charges the condenser 100 so that the control grid 91 is held biased to cut off current through the tube 83 for a desired period of time, which may be, for the application disclosed herein, a fraction of a second. The holding of the control grid 91 biased after the beam of light is cut off from or reduced upon the phototube is determined by the time constant of the R. C. circuit 99, 100.

The other section of the twin triode 97 is a control section for biasing the control grid of the electron discharge tube 76 so that it passes current for the other half wave whenever the first tube 83 of the pair of tubes 76 and 83 is biased to pass current therethrough. The control section of the tube 97 has a cathode 105 connected with the wire 85 which is in turn connected with one end of the resistance 84. The other end of the resistance 84 is connected by a wire 106 to the control grid 107 of the control section. The anode 108 is connected by a wire 109 to the control grid 80 of the tube 76 and also to the wire 78 through a resistance 110 of about .025 megohm. A condenser 111 of about .5 microfarad is connected in shunt with the resistance.

The control section of the twin triode 97 operates to normally bias the control grid of the other tube 76 of the pair of tubes 83 and 76 so that current does not pass therethrough and removes this bias only when the tube 83 passes current. Normally the control section passes current through a circuit including the secondary 72, wire 73, resistance 84, wire 85, through the control section, wire 109, resistance 110, wire 78, motor winding 53 and wire 52, 51 and 58. The current flow through the resistance 110 biases the control grid 80 to cut off current through the tube 76 and also charges the condenser. The time constant of the R. C. circuit 110, 111 is determined to retain the bias for about one quarter of a second in the application of the circuit disclosed herein.

When the tube 83 is biased to pass current therethrough as previously described, this current passes through the resistance 84 and biases the control grid 107 of the control section of the twin triode 97, to cut off current therethrough. With current through the control section cut off the bias is removed from the control grid 80 and current passes through the tube 76. The tube 76 continues to pass current so long as current is passing through the tube 83 and biasing the control section of the twin triode to cut off current therethrough. When current through the tube 83 is cut off under the control of the phototube 28, the control grid 80 is biased to cut off by current flow being restored through the control tube.

It will be seen therefore, that one of the windings of the variable speed motor 24 is connected with a pair of tubes for full wave power supply thereto and that one of the tubes is controlled by the phototube and the other or the second of the pair of tubes is controlled by a control tube to pass current through the second tube only when current is passing through the first of the pair of tubes. The small current through the amplifier section and control section of the twin triode does not affect the operation of the circuits as described. The twin triode obviously may be separate tubes.

The circuit disclosed in Figure 2 utilizes an amplifier between the phototube 28 and the first tube 83 of the pair of tubes 76 and 83. This amplifier is desirable although not necessary and a circuit without such amplifier for controlling the variable speed motor 24 is illustrated in Figure 3. The circuit shows the motor winding in two sections, one section 49 being directly connected with the power supply mains 45 through a switch 48. The power supply mains are also directly connected with the primary winding 114 of a transformer. The secondary winding is shown in two parts each part providing a potential of about 220 volts. One part 115 of the secondary winding namely the upper as shown in Figure 3, is connected in series with the other motor winding 53 and with a pair of electron discharge tubes 117 and 118 connected for full wave power supply to the motor winding. The adjacent ends of the primary and secondary winding and the adjacent ends of the motor windings are all connected together by a common ground wire including the wires 119 and 52.

The electron discharge tubes may be of any suitable kind having at least an anode, control grid and cathode. Each of the pair of tubes particularly illustrated includes also a screen grid 120 and 121 connected with the anode of its respective tube. The anode 123 of the first of the pair of tubes is connected with one end of the motor winding 53 so that the circuit through this tube includes the secondary winding 115, the wires 119 and 52 to one end of the motor winding 53, through the motor winding, the wires 78 and 124 to the anode 123, through the tube 117 and the wires 126, 127, resistance 128 of about 220 ohms, wires 129 and 130 to the other end of the first part 115 of the secondary winding of the transformer.

The other half of the wave passes through the other or the second tube 118 of the pair of electron discharge tubes through a circuit which includes the secondary winding 115 of the transformer, wire 130 to the plate 133 of the tube 118, cathode 134, wires 124 and 78, through the motor winding 53, wires 52 and 119 to the other end of the secondary winding 115.

The first electron discharge tube 117 of the pair of tubes 117 and 118 is controlled by means responsive to a change in the diameter of the material upon the spool. The means particularly illustrated is a phototube 28 having an anode 67 which is connected to the control grid 135 of the first of the pair of tubes through a wire 155 and resistance 136 of about 2 megohms. When the light beam projected upon the phototube is obstructed, a reduction in or cut off of the current passing through the phototube occurs which biases the control grid of the first tube 117 of the pair of tubes so that current passes therethrough and the motor winding 53 for a half wave.

The current passing through the tube 117 also passes through the resistance 128 which biases the control grid 140 of a control tube 139 to cut off current therethrough whenever current passes through the tube 117 controlled by the phototube 28. Preferably the control tube in this circuit includes a screen grid 141 and a suppressor grid 142. The anode 143 of the control tube and the anode 123 of the first tube 117 of the pair of tubes are connected to the same wire 124, so that current passes through both tubes upon the same half wave when the control grids are biased to pass current therethrough.

The circuit for the control tube 139 beginning at the secondary winding 115 includes the wires 130 and 129, resistance 128, through the tube 139, resistance 146 of about 25,000 ohms, wires 124 and 78, through the motor winding 53, wires 52 and 119 to the other end of the secondary winding 115 of the transformer. The screen grid 141 of the control tube is directly connected with the secondary winding of the transformer between the resistance 148 of about 50,000 ohms and resistance 149 of about 100,000 ohms so that the proper potential is applied thereto. The suppressor grid 142 is directly connected with the cathode of the control tube.

A condenser 152 of about .1 microfarad is connected in shunt with the resistance 146 so that when current passes through the control tube 139 energy is stored thereby. The control grid 153 of the second of the pair of tubes is connected to the anode of the control tube or between the condenser and resistance unit 146, 152 and the anode 143 of the control tube. The resistance condenser circuit has a time constant, for the application of the circuit herein, such that the condenser is discharged within about one quarter of a second.

The circuit of Figure 3 operates in a manner now to be described. When the light beam 31 falling upon the phototube 28 is obstructed or reduced by the increasing diameter of the turns of wire 11 on the spool 10, the current flow through the phototube is cut off or reduced which removes the bias on the control grid 135 of the first tube 117 of the pair of tubes so that current passes therethrough. Upon current passing through this tube, the motor winding 53 is energized for one half wave. The passing of current through the first tube of the pair of tubes and particularly the current flow through the resistance 128, biases the control grid 140 of the control tube 139 in the manner described hereinbefore so that current is cut off through the control tube and resistance 146 which removes the bias upon the control grid 153 of the other tube 118 of the pair of tubes so that current passes therethrough for the other half wave whereby the motor winding receives full wave current.

The motor now being energized rotates and alters the variable speed transmission so that the spool 10 is rotated at a slower speed and at the same time the cam rotates to drop the table 34 so that the phototube again receives the full beam 31 of light. When this occurs, the phototube 28 is again restored to its original illumination so that the control grid of the first of the pair of tubes is biased to cut off or substantially reduce the current flow therethrough which in turn removes the bias upon the control grid of the control tube so that current passes therethrough and this in turn charges the condenser 152 and biases the control grid of the second of the pair of tubes so that current therethrough is cut off or substantially reduced. Current is therefore cut off, or substantially reduced through the motor winding 53 so that the motor 24 either stops or rotates slowly until the light beam 31 is again interrupted by another increasing diameter of coils of wire on the spool 10.

The phototube 28, in the circuit of Figure 3, is energized by the other or lower portion 116 of the transformer secondary winding. The phototube circuit includes the secondary winding 116, wires 130 and 129, resistance 128, wire 127, resistance 154 of about 10 megohms, wire 155, through the phototube, wire 156, a portion of the resistance 157, resistance 158 to the other end of the secondary winding 116. The movable contact or potentiometer 159 permits adjustment to compensate for residual light falling upon the phototube.

The condenser and resistance circuit 146, 152 has a time constant which discharges the condenser within about one quarter of a second. With this time constant, the second of the pair of tubes is biased to cut off or reduce current therethrough shortly after the current through the phototube is restored by the light beam 31 again shining thereupon.

In the circuits heretofore described, provision has been made for full wave power supply to the variable speed motor 24. The motor 24 may have only a half wave supplied thereto, as shown in the circuit of Figure 4. The power supply mains 45 are connected to the switch 48 which is connected to one winding 49 of the variable speed motor 24 through the wires 54 and 52. The primary winding 162 of a transformer is also directly connected with the power supply mains 45 through wires 163 and 164. A secondary winding 165 delivering about 68 volts is connected by wire 166 to the cathode 65 of the phototube 28, and the other end of the winding is connected through a wire 167, and resistance 168 of about 10 megohms, to the anode 67 of the phototube. A resistance 169 of about 25 thousand ohms shunts the secondary winding and has an adjustable connection 170 with the wire 171 to compensate for residual light falling upon the phototube.

Another secondary winding 174 is connected with the heater of an electron discharge tube 175 and also to the light 29 not shown in this figure.

The secondary winding 178 providing 250 volts has one end thereof connected with the winding 53 of the motor 24 through the wires 179 and 78. The other end of the secondary is connected through wire 180 with the cathode 181 of the electron discharge tube 175. The wire 171 also connects with the wire 180. The anode 182 of the tube is connected to the center point on or the connected ends of the two windings of the motor. Preferably the tube has a screen grid 184 connected with the anode. A control grid 185 is connected with the anode 67 of the phototube.

In operation, so long as a beam of light is falling upon the phototube 28, current passes therethrough so that the potential across the resistance 168 biases the control grid so that no, or very little, current passes through the tube 175. The motor 24, therefore, does not rotate or rotates slowly. If however the beam of light is partially or wholly obstructed, the current through the phototube and resistance 168 is cut off or reduced which biases the control grid 185 of the tube 175 to pass current through the tube. Current is therefore supplied to the other winding 53 of the motor 24 through a circuit from the upper end of the secondary winding 179 through the wires 179 and 78, the motor winding 53, wire 52, wire 183 through the tube 175, wire 180, and to the other end of the secondary winding. The passage of current through motor winding 53 operates the motor to change the variable speed transmission which in turn drops the table 34 so that the beam of light again falls on the phototube 28. The phototube now being illuminated increases its flow of current therethrough which biases the control grid 185 of the tube to cut off or substantially reduce the current through the tube and motor winding so that the motor stops or rotates slowly. The half wave supplied to the motor at a relatively high voltage tends to overheat the motor winding, in applications where the motor is substantially in constant operation. For intermittent service the half wave circuit is satisfactory.

Although the circuits disclosed herein operate when the beam of light is cut off or partially intercepted to the phototube, it is to be understood that the circuits may be arranged to function for a reverse operation of the phototube. Also the phototube and light beam provide means which is controlled by the change in diameter of the material on the spool to in turn control the tube or tubes supplying current to the motor. It will be noted too that in each circuit one of the windings of the motor is connected in series with the electron discharge tube or tubes. The circuits may control a motor or any other high resistance load.

This invention provides an improvement in a motor control circuit. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A control circuit for an A. C. motor having two motor windings comprising a pair of tubes each having a cathode, control grid and anode adapted to be connected with a motor winding for full wave power supply thereto; means connected with the grid of the first of the pair of tubes and controlling the flow of current therethrough and through the motor winding for one half wave; and means including a control tube controlled by the passage of current in the first of the pair of tubes and connected to the control grid of the other of said pair of tubes to bias the same to pass current through the tube and motor winding for the other half wave.

2. A control circuit for an A. C. motor having two motor windings comprising a pair of tubes each having a cathode, control grid and anode adapted to be connected with a motor winding for full wave power supply thereto, a phototube connected with the control grid of one tube and controlling the flow of current therethrough and through the motor winding for one half wave, a control tube connected in the circuit and controlled by the passage of current in the first of the pair of tubes; and means connected in the control tube circuit and connected to the control grid of the other of said pair of tubes to bias the latter to pass current through the tube and motor winding for the other half wave.

3. A control circuit for an A. C. motor having a motor winding comprising a pair of tubes each having a cathode, control grid and anode adapted to be connected with a motor winding for full wave power supply thereto; a phototube connected with the grid of the first of the pair of tubes and controlling the flow of current therethrough for one half wave; a control tube having a cathode, control grid and anode and connected in the circuit in parallel with the tube controlled by the phototube; means biasing the grid of the control tube to cut off current therethrough upon passage of current in the first tube; and means connected in the control tube circuit and connected to the control grid of the other of said pair of tubes to bias the same to pass current through the tube and motor winding for the other half wave.

4. A control circuit for an A. C. motor having a motor winding comprising a pair of tubes each having a cathode, control grid and anode adapted to be connected with a motor winding for full wave power supply thereto; means including a phototube connected with the grid of the first of the pair of tubes and controlling the flow of current therethrough for one half wave; a resistance in series with the first of the pair of tubes, a control tube having a cathode, control grid and anode and having its grid connected with the resistance to control the tube upon passage of current in the first of the pair of tubes; and means connected in the control tube circuit and connected to the control grid of the other of said pair of tubes to bias the same to pass current through the tube and motor winding for the other half wave.

5. A control circuit for an A. C. motor comprising a pair of tubes each having cathode, control grid and anode and adapted to be connected with a motor winding for full wave power supply thereto; a phototube; an amplifier connected with the phototube and with the control grid of the first of the pair of tubes and controlling the flow of current through the latter for one half wave; a control tube connected in the circuit and controlled by the passage of current in the first of the pair of tubes; and means connected in the control tube circuit and connected to the control grid of the other of said pair of tubes to bias the same to pass current through the tube and motor winding for the other half wave.

6. A motor and control circuit comprising an A. C. motor having two windings, a transformer having a primary and a secondary winding; an electron discharge tube having a cathode, control grid and anode connected in series with the secondary winding and one of the motor windings for power supply to the latter; and a phototube connected with the grid of the electron discharge tube to control the flow of current therethrough and through the motor winding for one half wave.

7. A motor and control circuit comprising an A. C. motor having two windings; a transformer having a primary and a secondary winding; a pair of electron discharge tubes each having a cathode, control grid and anode, and connected in series with the secondary winding and the motor winding for full wave power supply to the latter; means connected with the control grid of the first of the pair of tubes to control the flow of current therethrough for one half wave; a control tube controlled by the current flow through the first of the pair of tubes; and the control grid of the second of said pair of tubes being connected with the anode of the control tube and controlled thereby to bias the former to pass current through the tube and motor winding for the other half wave.

8. A motor and control circuit comprising an A. C. motor having two windings; a transformer having a primary and a secondary winding; a pair of electron discharge tubes each having a cathode, control grid and anode, and connected in series with the secondary winding and a motor winding for full wave power supply to the latter; means connected with the grid of the first of the pair of tubes to control the flow of current therethrough and the motor winding for one half wave; a resistance in series with the first of the pair of electron discharge tubes; a control tube controlled by the current flow through the aforesaid resistance and the first of the pair of tubes; and the control grid of the second of said pair of tubes being connected with the anode of the control tube and controlled by the latter to bias the former to pass current through the tube and motor winding for the other half wave.

9. A motor and control circuit comprising an A. C. motor having two windings; a transformer having a primary and a secondary winding; a pair of electron discharge tubes each having a cathode, control grid and anode, and connected in series with the secondary winding and a motor winding for full wave power supply to the latter; means connected with the control grid of the first of the pair of tubes to control the flow of current therethrough and the motor winding for one half wave; a resistance in series with the first of the pair of electron discharge tubes; a control tube controlled by the current flow through the aforesaid resistance and the first of the pair of tubes; a condenser and resistance in parallel connected with the anode of the control tube; and the control grid of the second of said pair of tubes being connected with the anode of the control tube and controlled by the latter to bias the former to pass current through the tube and motor winding for the other half wave.

10. A motor and control circuit comprising an A. C. motor having two windings; a transformer having a primary and a secondary winding; a pair of electron discharge tubes each having a cathode, control grid and anode, and connected in series with the secondary winding and a motor winding for full wave power supply to the latter; means connected with the grid of the first of the pair of tubes to control the flow of current therethrough and the motor winding for one half wave; a resistance in series with the first of the pair of electron discharge tubes; means controlling the current flow through the second of the pair of tubes including a control tube controlled by the current flow through the aforesaid resistance and the first of the pair of tubes and a condenser and resistance in parallel connected with the anode of the control tube; and the control grid of the second of said pair of tubes being connected with the anode of the control tube and controlled by the next aforesaid means to bias the former to pass current through the tube and motor winding for the other half wave.

11. A motor and control circuit comprising an A. C. motor having two windings; a transformer having a primary and a secondary winding; a pair of electron discharge tubes each having a cathode, control grid and anode, and connected in series with the secondary winding and a motor winding for full wave power supply to the latter; a phototube connected with the control grid of the first of the pair of tubes to control the flow of current therethrough and the motor winding for one half wave; a resistance connected with the cathode of and in series with the first of the pair of electron discharge tubes; a control tube controlled by the current flow through the aforesaid resistance and the first of the pair of tubes; a condenser and resistance in parallel connected with the anode of the control tube; and the control grid of the second of said pair of tubes being connected with the anode of the control tube and controlled by the latter to bias the former to pass current through the tube and motor winding for the other half wave.

12. A motor and control circuit comprising an A. C. motor having at least two windings, a transformer having a primary and a secondary winding corresponding ends of which and the motor winding are connected together, a pair of electron tubes each having a cathode, control grid and anode connected in series with the first section of the secondary winding and the motor winding for full wave power supply to the latter, means connected with the grid of one of the pair of tubes to control the flow of current therethrough for one half wave, a control tube connected in the circuit and biased to cut off current therethrough upon passage of current in the tube controlled by the next aforesaid means, means connected in the anode circuit of the control tube to store energy during the period when current is passing therethrough, and the control grid of the other of said pair of tubes being connected between the energy storage means and the anode of the control tube to bias the control grid to pass current through the tube and motor winding for the other half wave.

13. A motor and control circuit comprising an A. C. motor having at least two windings; a transformer having a primary and a secondary winding; a pair of electron discharge tubes each having a cathode, control grid and anode and connected in series with the secondary winding and with a motor winding for full wave power supply to the latter; a phototube connected with the grid of one tube and controlling the flow of current therethrough for one half wave; a control tube connected in the circuit and biased to cut off current therethrough upon passage of current in the tube controlled by the phototube; and means connected in the control tube circuit and connected to the control grid of the other of said pair of tubes to bas the same to cut off current through the tube and motor winding when current is passing through the control tube and to remove the bias and pass current through said tube and motor winding when the current is cut off through the control tube.

14. A motor and control circuit comprising an A. C. motor having at least two windings; a transformer having a primary and a secondary winding; a pair of electron discharge tubes each having a cathode, control grid and anode and connected in series with the secondary winding of the transformer and one of the motor windings for full wave power supply to the latter; a phototube connected with the grid of the first of the pair of tubes and controlling the flow of current therethrough for one half wave, a control tube connected in the circuit in parallel with the first of the pair of tubes; means biasing the grid of the control tube to cut off current therethrough upon passage of current in the tube controlled by the phototube; and means connected in the control tube circuit and connected to the control grid of the other of said pair of tubes to bias the same to cut off current through the tube and motor winding during the period when current is passing through the control tube and to remove the bias and pass current through said tube and the motor winding for the other half wave when current is cut off through the control tube.

15. A motor and control circuit comprising an A. C. motor having at least two windings; a transformer having a primary and a secondary winding; a pair of electron discharge tubes each having a cathode, control grid and anode connected in series with the secondary winding and with the motor winding for full wave power supply to the latter; a phototube connected with the grid of the first of the pair of tubes and controlling the flow of current therethrough for one half wave; a control tube connected in the circuit in parallel with the first of the pair of tubes; a resistance connected to the cathode of the first of the pair of tubes and the control tube and connected with the control grid of the latter to cut off current therethrough upon passage of current in the former tube; and means connected in the control tube circuit and connected to the control grid of the other of said pair of tubes to bias the same to cut off current through the tube and motor winding during the period when current is passing through the control tube and to remove the bias and pass current through said tube and motor winding for the other half wave when current is cut off through the control tube.

16. A motor and control circuit comprising an A. C. motor having two windings; a transformer having a primary and a secondary winding; a pair of electron discharge tubes each having a cathode, control grid and anode connected in series with the secondary winding and with the motor winding for full wave power supply to the latter; a phototube connected with the grid of the first of the pair of tubes and controlling the flow of current therethrough for one half wave; a control tube connected in the circuit and biased to cut off current therethrough upon passage of current in the first of the pair of tubes; means connected in the anode circuit of the control tube to provide a potential drop during the period when current is passing through the control tube; and means connecting the control grid of the other of said pair of tubes between the anode and the next aforesaid means to bias the control grid to cut off current through said other tube and motor winding when the control tube is passing current and to remove the bias and pass current therethrough for the other half wave when current is cut off through the control tube.

17. A motor and control circuit comprising an A. C. motor having two windings; a transformer having a primary and a secondary winding; a pair of electron discharge tubes each having a cathode, control grid and anode connected in series with the secondary winding and with the motor winding for full wave power supply to the latter; a phototube connected with the grid of the first of the pair of tubes and controlling the flow of current therethrough for one half wave; a control tube connected in the circuit in parallel with the first of the pair of tubes; a resistance having one end connected to the cathode of the first tube and of the control tube and the other end connected with the control grid of the latter tube to bias the same to cut off current therethrough upon passage of current in the former tube; means connected in the anode circuit of the control tube to provide a potential drop during the period when current is passing through the control tube; and means connecting the control grid of the other of said pair of tubes between the anode and the next aforesaid means to bias the grid to cut off current through the other of the pair of tubes when current is passing through the control tube and to remove the bias to pass current through said tube and motor winding for the other half wave when current is cut off in the control tube.

18. A motor and control circuit comprising an A. C. motor having two windings; a transformer having a primary and a secondary winding, the secondary winding having a first and second section; a pair of electron discharge tubes each having a cathode, control grid and anode connected in series with a motor winding and the first section of the secondary winding for full wave power supply to the motor winding; a phototube having a cathode and anode connected to the second section of the secondary winding and having its anode connected with the end of the second section adjacent the first section and with the control grid of the first of the pair of tubes to control the flow of current therethrough for one half wave; a control tube connected in the circuit and biased to cut off current therethrough upon passage of current in the first of the pair of tubes; and means connected in the control tube circuit and connected to the control grid of the other of said pair of tubes to bias the same to cut off current through the tube and motor winding when current is passing through the control tube and to remove the bias to pass current through the tube and motor winding for the other half wave when current is cut off in the control tube.

19. A motor and control circuit comprising an A. C. motor having two windings, a transformer having a primary and a secondary winding corresponding ends of which and the motor winding are connected together, the secondary winding having a first and a second section; a pair of electron discharge tubes each having a cathode, control grid and anode connected in series with the first section of the secondary winding and the motor winding for full wave power supply to the latter; a phototube having a cathode and anode; the anode of the phototube being connected to the end of the second section of the secondary winding adjacent the first section and also connected with the control grid of the first of the pair of the tubes to control the flow of current therethrough for one-half wave; a control tube connected in the circuit and controlled to cut off current therethrough upon passage of current in the first of the pair of tubes; a condenser and resistance in parallel connected in the anode circuit of the control tube to store energy during the period when current is passing therethrough; and the control grid of the other of said pair of tubes being connected with the anode of the control tube to control the former to pass current through the tube and motor winding for the other half wave when current is passing through the first tube.

20. A motor and control circuit comprising an A. C. motor having two windings; a transformer having a primary and a secondary winding; a pair of electron discharge tubes each having a cathode, control grid and anode and connected in series with the secondary winding and the motor winding for full wave power supply to the latter; an amplifier connected with the control grid of the first of the pair of tubes and biasing the latter to cut off when current is flowing through the amplifier; a phototube having a cathode and anode, the cathode of the phototube being connected with the control grid of the amplifier to cut off the flow of current therethrough upon a change of current through the phototube; a control tube connected with the first of the pair of tubes to cut off current therethrough upon passage of current in the first tube; a condenser and resistance in parallel connected in the anode circuit of the control tube to store energy during the period when current is passing therethrough, and the control grid of the other of said pair of tubes being connected with the anode of the control tube to bias the former to pass current through the tube and motor winding for the other half wave when current through the control tube is cut off.

21. A motor and control circuit comprising an A. C. motor having two windings; a transformer having a primary and a secondary winding; a pair of electron discharge tubes each having a cathode, control grid and anode and connected in series with the secondary winding and the motor winding for full wave power supply to the latter; a phototube; an amplifier controlled by the phototube and connected with the control grid of the first of the pair of tubes to control the flow of current therethrough for one half wave; a control tube connected with the anode of the first of the pair of tubes and controlled by the latter; a condenser and resistance in parallel connected in the anode circuit of the control tube; and the control grid of the second of said pair of tubes being connected with the anode of the control tube and controlled thereby to pass current through the other of the pair of tubes and motor winding for the other half wave when current passes through the first of the pair of tubes.

22. A motor and control circuit comprising an A. C. motor having two windings; a transformer having a primary and a secondary winding; a pair of electron discharge tubes each having a cathode, control grid and anode, and connected in series with the secondary winding and the motor winding for full wave power supply to the latter; a phototube; an amplifier having a cathode, control grid and anode, the control grid being connected with the phototube to control the operation of the amplifier, a resistance and a condenser in shunt therewith connected with the anode of the amplifier, the anode also being connected with the control grid of the pair of tubes to control the flow of current therethrough for one half wave; a control tube connected with the anode of the first of the pair of tubes and controlled by the latter; a resistance and a condenser in shunt therewith connected in the anode circuit of the control tube; and the control grid of the second of said pair of tubes being connected with the anode of the control tube and controlled thereby to pass current through the other of said pair of tubes and motor winding for the other half wave when current passes through the first of the pair of tubes.

23. A motor and control circuit comprising an A. C. motor having two windings; a transformer having a primary and a secondary winding; a pair of electron discharge tubes each having a cathode, control grid and anode and connected in series with the secondary winding and the motor winding for full wave power supply to the latter; a phototube; an amplifier having a cathode, control grid and anode, the control grid being connected with the phototube to control the operation of the amplifier, a resistance and a condenser in shunt therewith connected with the anode, the anode also being connected with the control grid of the first of the pair of tubes to control the flow of current therethrough for one-half wave; a resistance in series with the first of the pair of tubes; a control tube controlled by the potential across the next aforesaid resistance; a resistance and a condenser in shunt therewith connected with the anode of the control tube; and the control grid of the second of said pair of tubes being connected with the anode of the control tube and controlled thereby to pass current through the tube and motor winding for the other half wave when current is passing through the first of the pair of tubes.

24. A motor and control circuit comprising an A. C. motor having two windings; a transformer having a primary and a secondary winding; a pair of electron discharge tubes each having a cathode, control grid and anode and connected in series with the secondary winding and the motor winding for full wave power supply to the latter; an amplifier having a cathode, control grid and anode; means connected with the control grid of the amplifier to cut off current through the amplifier; a resistance and a condenser in shunt therewith connected with the anode of the amplifier, the anode also being connected with the control grid of the first of the pair of tubes to control the flow of current therethrough for one half wave; a resistance in series with the first of the pair of tubes; a control tube having a cathode, control grid and anode, the control grid being biased to cut off by the potential across the next aforesaid resistance when current passes therethrough; a resistance and a condenser in shunt therewith connected in the anode circuit of the control tube; and the control grid of the second of said pair of tubes being connected with the anode of the control tube and controlled thereby to bias the former to pass current through the tube and motor winding for the other half wave whenever current is passing through the first of the pair of tubes.

25. A motor and control circuit comprising an A. C. motor having two windings; a transformer having a primary and a secondary winding; a pair of electron discharge tubes each having a cathode, control grid and anode and connected in series with the secondary winding and the motor winding for full wave power supply to the latter; a phototube having a cathode and anode; a condenser connected with the cathode of the phototube; an amplifier having a cathode, control grid and anode, the control grid being connected to the cathode of the phototube to normally pass current through the amplifier, a resistance and a condenser in shunt therewith connected with the anode of the amplifier; the anode of the amplifier also being connected with the control grid of the first of the pair of tubes to control the flow of current therethrough for one half wave; a resistance in series with the first of the pair of tubes; a control tube normally passing current therethrough and biased to cut off by the potential across the next aforesaid resistance; a resistance and condenser in shunt therewith connected with the anode of the control tube; and the control grid of the second of said pair of tubes being connected with the anode of the control tube and controlled thereby to bias the former to pass current through the tube and motor winding for the other half wave whenever current is passing through the first of the pair of tubes.

STEPHEN J. DEITZ.